(12) United States Patent
Nobes et al.

(10) Patent No.: US 10,921,162 B2
(45) Date of Patent: Feb. 16, 2021

(54) ROTARY SWITCH OR OTHER ENCODER HAVING NON-SEQUENTIAL UNIQUE BIT PATTERN AND METHOD FOR DESIGN

(71) Applicant: Raytheon Canada Ltd., Ottawa (CA)

(72) Inventors: Ryan W. Nobes, New Lowell (CA); Kevin B. Wagner, Wyevale (CA)

(73) Assignee: Raytheon Canada Ltd., Ottawa (CA)

( * ) Notice: Subject to any disclaimer, the term of this patent is extended or adjusted under 35 U.S.C. 154(b) by 0 days.

(21) Appl. No.: 16/752,135

(22) Filed: Jan. 24, 2020

(65) Prior Publication Data
US 2020/0158542 A1 May 21, 2020

Related U.S. Application Data

(63) Continuation of application No. PCT/CA2017/051500, filed on Dec. 12, 2017.

(51) Int. Cl.
*G01D 5/252* (2006.01)
*G01D 5/34* (2006.01)
*G05G 1/08* (2006.01)

(52) U.S. Cl.
CPC ............. *G01D 5/252* (2013.01); *G01D 5/342* (2013.01); *G05G 1/08* (2013.01)

(58) Field of Classification Search
CPC ...... G01D 5/252; G01D 5/342; G01D 5/2497; G05G 1/08; H03M 1/32
USPC .......................................................... 341/11
See application file for complete search history.

(56) References Cited

U.S. PATENT DOCUMENTS

| | | | | |
|---|---|---|---|---|
| 4,714,913 A | * | 12/1987 | Cohen ................... | H03M 1/303 327/12 |
| 5,276,738 A | * | 1/1994 | Hirsch .................. | H04L 9/0869 380/46 |
| 5,739,775 A | * | 4/1998 | Brandestini .......... | G01D 5/2492 341/10 |
| 5,751,230 A | * | 5/1998 | Brandestini .......... | G01D 5/2492 341/10 |
| 5,880,683 A | * | 3/1999 | Brandestini .......... | G01D 5/2492 341/10 |

(Continued)

FOREIGN PATENT DOCUMENTS

| | | |
|---|---|---|
| CN | 1487269 A | 4/2004 |
| CN | 103528612 A | 1/2014 |
| EP | 0635700 A1 | 1/1995 |

OTHER PUBLICATIONS

International Search Report and Written Opinion of the International Searching Authority in connection with International Patent Application No. PCT/CA2017/051500 dated Aug. 21, 2018 , 8 pages.

*Primary Examiner* — Jean B Jeanglaude

(57) ABSTRACT

An apparatus for rotary encoding includes a knob configured to be rotated. The apparatus also includes multiple switches each configured to selectively form or not form a connection based on a current rotational position of the knob. The apparatus further includes a controller configured to generate or use a digital value associated with the current rotational position of the knob. The digital value is defined by which switches have or have not formed connections. Locations where the switches form the connections are selected such that the digital values uniquely identify different rotational positions of the knob and are non-sequential as the knob is rotated.

20 Claims, 9 Drawing Sheets

(56) References Cited

U.S. PATENT DOCUMENTS

| | | | | |
|---|---|---|---|---|
| 7,012,965 | B2* | 3/2006 | Yin | G06F 7/74 375/242 |
| 7,864,086 | B2* | 1/2011 | Monro | H03M 7/3082 341/107 |
| 9,212,935 | B2* | 12/2015 | Hisamune | G01D 5/1655 |
| 2003/0118118 | A1* | 6/2003 | Yin | G06F 7/74 375/242 |
| 2010/0085221 | A1* | 4/2010 | Monro | H03M 7/3082 341/65 |
| 2016/0305795 | A1 | 10/2016 | Eisenbeis | |

* cited by examiner

0001

0011

0111

0010

0110

1110

0100

1100

1101

1000

1001

1011

US 10,921,162 B2

ROTARY SWITCH OR OTHER ENCODER HAVING NON-SEQUENTIAL UNIQUE BIT PATTERN AND METHOD FOR DESIGN

CROSS-REFERENCE TO RELATED APPLICATION AND PRIORITY CLAIM

This application claims priority as a continuation of International Patent Application No. PCT/CA2017/051500 filed on Dec. 12, 2017, which is hereby incorporated by reference in its entirety.

TECHNICAL FIELD

This disclosure generally relates to encoding devices. More specifically, this disclosure relates to a rotary switch or other encoder having a non-sequential unique bit pattern and a method for its design.

BACKGROUND

Numerous devices and systems include rotary switches or other rotary encoders. A rotary encoder typically translates an object's rotational position into an encoded data value. For example, a rotary encoder can include a knob that can be rotated by a user, and the current rotational position of the knob can be converted into a digital value. Different rotational positions of the knob typically correspond to different digital values, and the digital values generated by the rotary encoder can be used to perform various functions. As specific examples, rotary encoders can be used as volume controls or tuning dials for radios or as intensity controls for light sources.

Unfortunately, rotary encoders typically have a finite number of positions for which different digital values can be generated. The diameter of a rotary encoder can increase significantly as the number of finite positions increases. This can increase the size, weight, or cost of the rotary encoder or of an overall system that includes the rotary encoder.

SUMMARY

This disclosure provides a rotary switch or other encoder having a non-sequential unique bit pattern and a method for its design.

In a first embodiment, an apparatus for rotary encoding includes a knob configured to be rotated. The apparatus also includes multiple switches each configured to selectively form or not form a connection based on a current rotational position of the knob. The apparatus further includes a controller configured to generate or use a digital value associated with the current rotational position of the knob. The digital value is defined by which switches have or have not formed connections. Locations where the switches form the connections are selected such that the digital values uniquely identify different rotational positions of the knob and are non-sequential as the knob is rotated.

In a second embodiment, a system includes a rotary encoder that includes a knob configured to be rotated, multiple switches each configured to selectively form or not form a connection based on a current rotational position of the knob, and a controller configured to generate or use a digital value associated with the current rotational position of the knob. The digital value is defined by which switches have or have not formed connections. Locations where the switches form the connections are selected such that the digital values uniquely identify different rotational positions of the knob and are non-sequential as the knob is rotated. The system also includes circuitry configured to receive an output from the controller, where the output includes the digital value or a signal based on the digital value.

In a third embodiment, a method includes identifying a specified number of bits to be used to represent a rotational position of a knob of a rotary encoder. The method also includes identifying multiple binary values each containing the specified number of bits. The binary values are circularly-shift exclusive of one another such that each binary value is not a circularly shifted version of the other binary values. The method further includes creating a binary string using at least some of the binary values. In addition, the method includes using bits in the binary string to identify different positions at which switches of the rotary encoder will or will not form connections in order to identify a current rotational position of the knob, where the different positions are located radially around a center of the knob.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1A through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, numerous devices and systems include rotary encoders, but the diameter of a rotary encoder can increase significantly as the encoder's required number of finite positions increases. This disclosure describes a technique for designing a non-sequential unique bit pattern for rotary encoders. The rotary encoders can then be designed so that switches of the rotary encoders form connections (such as electrical, optical, or magnetic connections) in certain positions within the rotary encoders based on the designed bit pattern. At least portions of the switches can be placed at the same or similar radial distance from a center of a knob, dial, pointer, or other object that can be rotated. Switches that form a connection can be assigned a "1" digital bit, and switches that do not form a connection can be assigned a "0" digital bit (or vice versa). The switches can therefore be used to generate a multi-bit digital value that defines the current rotational position of the object. The locations where the switches form connections can be selected based on the designed bit pattern so that (i) non-sequential digital values are generated as the object is rotated and (ii) the digital values uniquely define the different discrete rotational positions of the object.

The designed bit pattern helps to ensure that different discrete rotational positions of a rotary encoder are associated with different digital values, so the rotational positions of an object can be easily identified using the digital values. Among other things, this approach allows a compact rotary encoder to be designed, and the rotary encoder can have an increased number of discrete rotational positions associated with digital values compared to conventional encoders. This reduces the need for a large-diameter rotary encoder since a coded bit pattern can be obtained using a more compact solution. Also, a smaller or more compact encoder (compared to larger-diameter encoders) can improve the encoder's ease of use, thereby making the rotary encoder more ergonomical. In addition, such a rotary encoder can have a reduced size, weight, or cost, which can also reduce the size, weight, or cost of the overall system in which the rotary encoder is used.

Figure 1A:
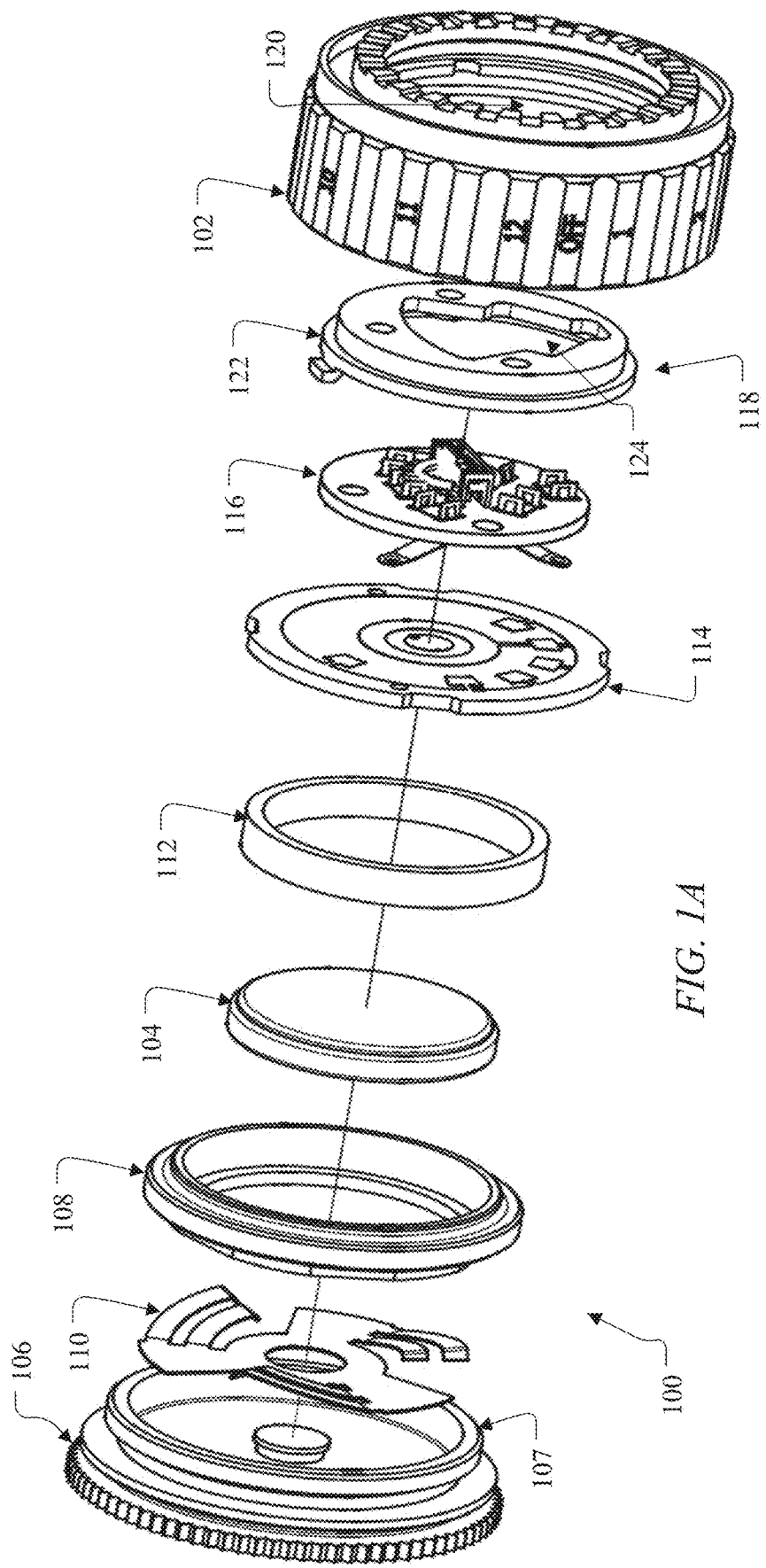
FIGS. 1A through 1C illustrate an example rotary encoder having a non-sequential unique bit pattern according to this disclosure.
Figure 1B:
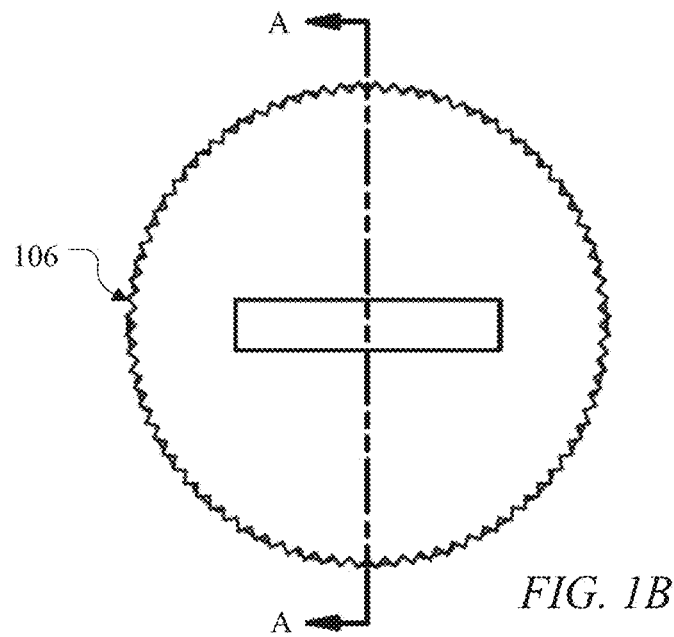
Figure 1C:
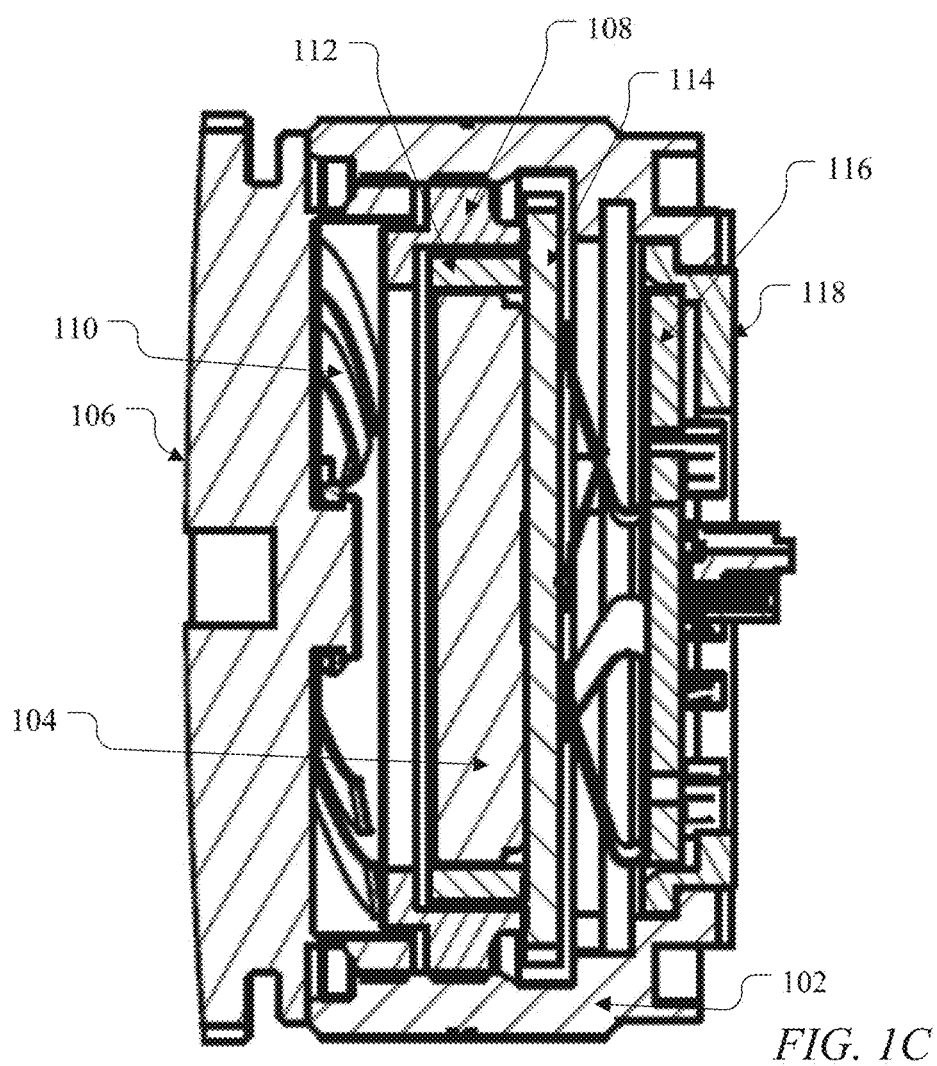

FIGS. 1A through 1C illustrate an example rotary encoder 100 having a non-sequential unique bit pattern according to this disclosure. More specifically, FIG. 1A illustrates an exploded view of the rotary encoder 100, and FIG. 1B illustrates an end view of an assembled version of the rotary encoder 100. Also, FIG. 1C illustrates a cross-sectional view of the assembled version of the rotary encoder 100, where the cross-section is taken along line A-A in FIG. 1B.

As shown in FIGS. 1A through 1C, the rotary encoder 100 includes a switch knob 102, a power supply 104, and a power supply cap 106. The switch knob 102 generally represents an object that can be rotated, such as by a user. The rotary encoder 100 can then generate one or more digital values based on the rotational position(s) of the switch knob 102. The switch knob 102 can be formed from any suitable material(s), such as metal or plastic. The switch knob 102 can also be formed in any suitable manner, such as machining, injection molding, or additive manufacturing. In addition, the switch knob 102 can have any suitable size, shape, and dimensions. In this example, the switch knob 102 is generally cylindrical with a grooved outer surface, although other forms can be used for the switch knob 102.

The power supply 104 provides electrical power for the rotary encoder 100 and optionally for one or more external components. For example, the power supply 104 can provide electrical power for a controller or other components of the rotary encoder 100 so that the rotary encoder 100 can generate or use digital values identifying the rotational positions of the switch knob 102. The power supply 104 can also provide electrical power for other circuit components coupled to the rotary encoder 100. The power supply 104 in this example represents an electro-chemical storage device, such as a CR2032 coin battery or other battery. However, the power supply 104 can have a number of other forms and need not represent a coin battery or other battery. For instance, the power supply 104 can include one or more supercapacitors or fuel cells.

The power supply cap 106 can be permanently or removably secured to the switch knob 102 or other component(s) of the rotary encoder 100 in order to retain the power supply 104 within the rotary encoder 100. In this example, a raised rim 107 of the power supply cap 106 can be snapped into a recessed inner groove of the switch knob 102 to secure the power supply cap 106. Other mechanisms for securing the power supply cap 106 to the switch knob 102 or other component(s) of the rotary encoder 100 can also be used, such as when part of the power supply cap 106 is threaded and can be screwed into or onto the switch knob 102. The ability to removably secure the power supply cap 106 allows the power supply cap 106 to be removed when needed or desired, such as to replace the power supply 104. The power supply cap 106 can be formed from any suitable material(s), such as metal or plastic. The power supply cap 106 can also be formed in any suitable manner, such as machining, injection molding, or additive manufacturing. In addition, the power supply cap 106 can have any suitable size, shape, and dimensions. In this example, part of the power supply cap 106 is a generally circular surface with a ridged periphery, although other forms can be used for the power supply cap 106.

In this example, a first terminal of the power supply 104 (such as the positive terminal) is electrically coupled to a power supply contact 108 via a contact spring 110. That is, the first terminal of the power supply 104 touches the contact spring 110, which provides spring force to help maintain contact with the power supply 104. The contact spring 110 touches the power supply contact 108, which creates an electrical path between the first terminal of the power supply 104 and the power supply contact 108. The power supply contact 108 and the contact spring 110 can each be formed from any suitable conductive material(s), such as metal. The power supply contact 108 and the contact spring 110 can each also be formed in any suitable manner, such as machining, injection molding, or additive manufacturing. In addition, the power supply contact 108 and the contact spring 110 can each have any suitable size, shape, and dimensions.

An insulator 112 is positioned around the power supply 104 and helps to electrically insulate the power supply 104 from the power supply contact 108 except via the contact spring 110. The insulator 112 can be formed from any suitable insulative material(s), such as plastic or other dielectric. The insulator 112 can also be formed in any suitable manner, such as machining, injection molding, or additive manufacturing. In addition, the insulator 112 can have any suitable size, shape, and dimensions. In this example, both the insulator 112 and the power supply 104 are sized to fit within the power supply contact 108, which helps to reduce or minimize the space occupied by these components. It should be noted, however, that this nesting of components is not required and that the power supply 104 can be coupled to other components of the rotary encoder 100 in any other suitable manner. Moreover, the power supply 104 can actually reside outside the rotary encoder 100, in which case the rotary encoder 100 can include electrical connections to the power supply 104.

To support encoding of the rotational position of the switch knob 102, the rotary encoder 100 includes an interconnect assembly 114 and a switch assembly 116. As described in more detail below, the interconnect assembly 114 and the switch assembly 116 are used to allow switches to selectively form or not form electrical, optical, magnetic, or other connections, depending on the rotational position of the switch knob 102. A controller of the rotary encoder 100 uses the connections or lack thereof to generate a digital value representing the current rotational position of the switch knob 102, and the controller generates different digital values as the switch knob 102 is moved to different discrete rotational positions.

A retainer 118 can be used to maintain proper orientation of the interconnect assembly 114 and the switch assembly 116 and to keep the interconnect assembly 114 and the switch assembly 116 in physical contact with another (or in other suitable positions so that the switch connections can be formed). In this example, part of the retainer 118 fits within a central opening 120 of the switch knob 102, and the retainer 118 includes an outer rim 122 that prevents the retainer 118 from passing completely through the central opening 120 of the switch knob 102. A portion of the switch assembly 116 can be placed through an opening 124 of the retainer 118, and a shape of the opening 124 is complementary to the overall shape of components in the switch assembly 116. Rotation of the switch knob 102 causes the retainer 118 and therefore the switch assembly 116 to rotate, while the interconnect assembly 114 remains generally stationary and does not rotate significantly. This moves at least portions of the switches, which also changes what connections might be formed using those switches. The retainer 118 can be formed from any suitable insulative material(s), such as plastic or other dielectric. The retainer 118 can also be formed in any suitable manner, such as machining, injection molding, or additive manufacturing. In addition, the retainer 118 can have any suitable size, shape, and dimensions.

In this particular example, the switch knob 102 includes twelve discrete rotational positions, along with additional "off" positions located between the discrete rotational positions. Thus, the switch knob 102 can support discrete 15° steps or clicks during rotation. This also means that the rotary encoder 100 can generate twelve different digital values corresponding to twelve different rotational positions of the switch knob 102. Note, however, that the switch knob 102 can support any suitable number of discrete rotational positions that correspond to different digital values, and the switch knob 102 need not move in clicks or steps.

Although FIGS. 1A through 1C illustrate one example of a rotary encoder 100 having a non-sequential unique bit pattern, various changes may be made to FIGS. 1A through 1C. For example, the form factor of the rotary encoder 100 shown here is for illustration only. Rotary encoders can have a variety of designs and form factors, and any suitable rotary encoder can be designed based on a non-sequential unique bit pattern as described in this patent document. As an example, the rotary encoder 100 can be designed so that the switch knob 102 causes the interconnect assembly 114 to rotate while the switch assembly 116 remains fixed.

Figure 2A:
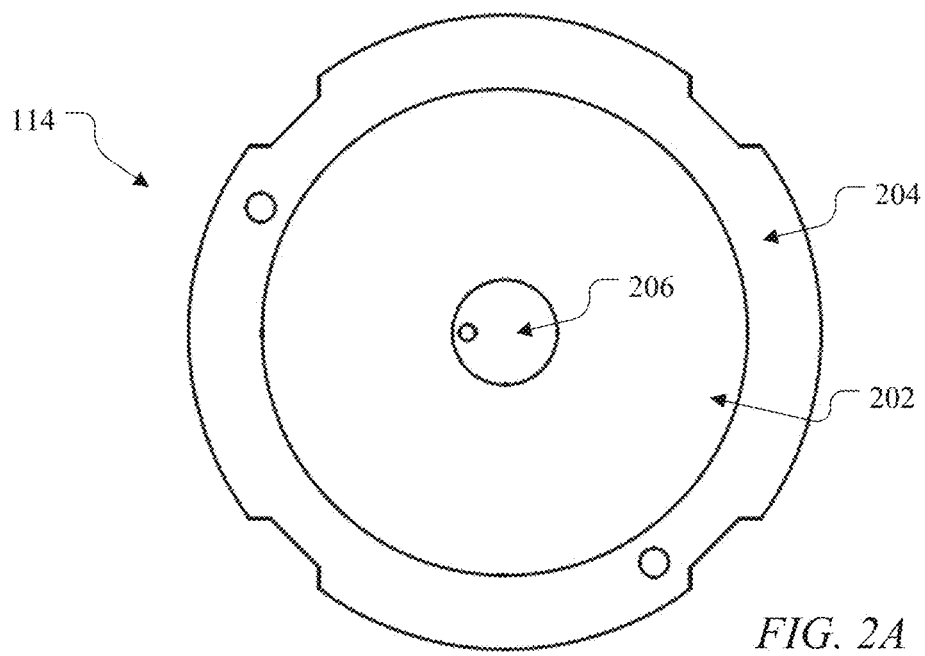
FIGS. 2A through 3C illustrate example components in the rotary encoder of FIGS. 1A through 1C according to this disclosure.
Figure 2B:
Figure 2C:
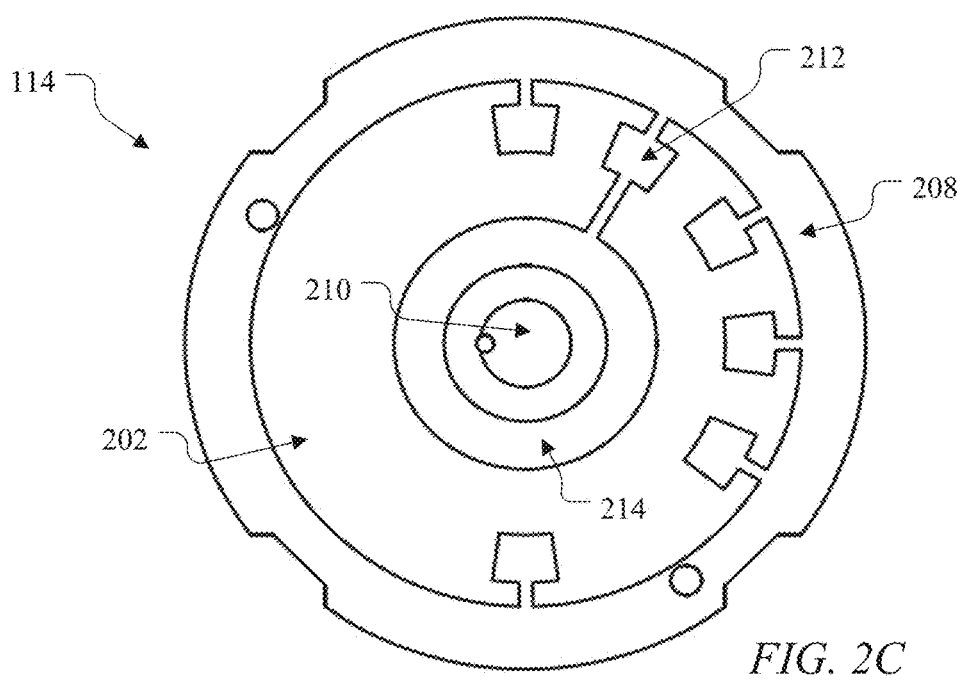
Figure 3A:
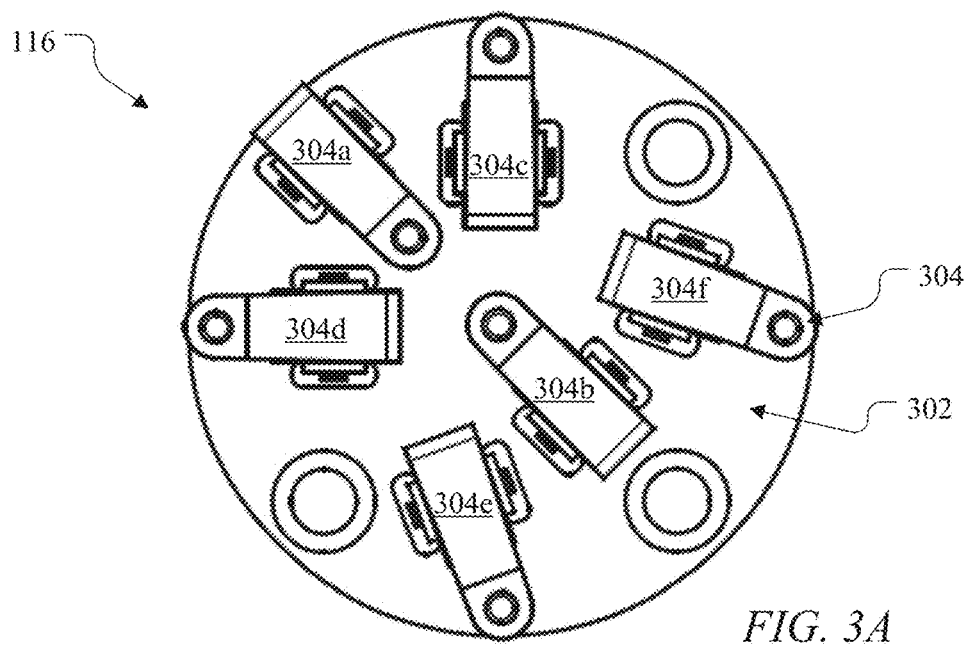
Figure 3B:
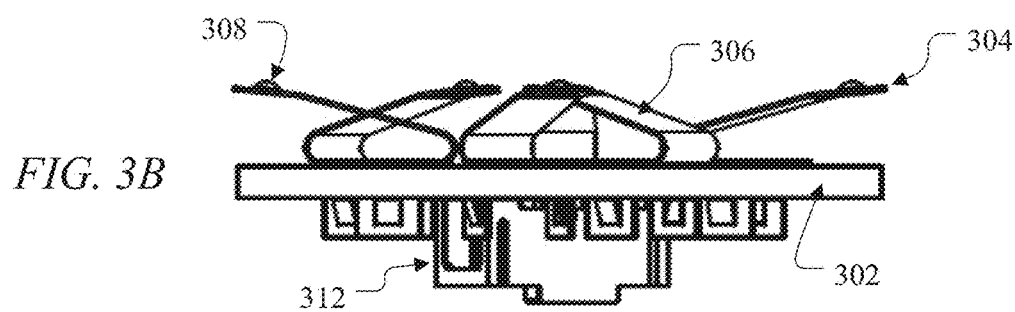
Figure 3C:
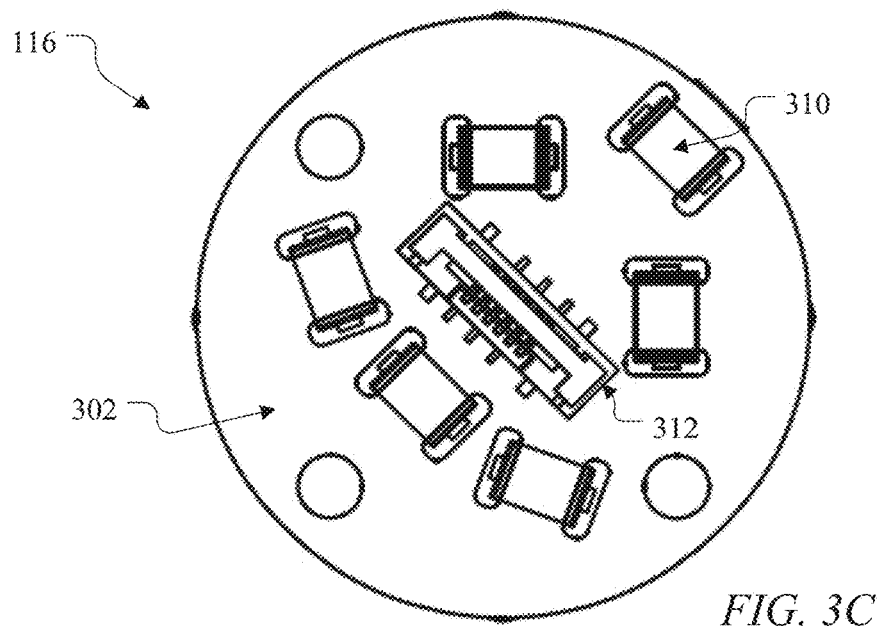

FIGS. 2A through 3C illustrate example components in the rotary encoder 100 of FIGS. 1A through 1C according to this disclosure. More specifically, FIGS. 2A through 2C illustrate an example implementation of the interconnect assembly 114 in the rotary encoder 100, and FIGS. 3A through 3C illustrate an example implementation of the switch assembly 116 in the rotary encoder 100.

As shown in FIGS. 2A through 2C, the interconnect assembly 114 includes a substrate 202 on and through which various other components of the interconnect assembly 114 are mounted or formed. The substrate 202 is generally planar here and includes two opposing major surfaces. The major surface in FIG. 2A faces the power supply 104 when in use, and the major surface in FIG. 2C faces the switch assembly 116 when in use. The substrate 202 includes any suitable structure that carries or supports other components of the interconnect assembly 114, such as one or more dielectric materials. In some embodiments, the substrate 202 represents a printed circuit board.

As shown in FIG. 2A, one side of the substrate 202 includes electrical paths 204 and 206. The electrical path 204 can touch the power supply contact 108 to form an electrical connection between the first terminal of the power supply 104 and the interconnect assembly 114. The electrical path 206 can touch the second terminal of the power supply 104 to form an electrical connection between the second terminal of the power supply 104 and the interconnect assembly 114.

As shown in FIG. 2C, the other side of the substrate 202 includes electrical paths 208 and 210. The electrical path 208 is electrically coupled to the electrical path 204, such as by using one or more conductive vias that extend between the electrical paths 204 and 208 through the substrate 202. Similarly, the electrical path 210 is electrically coupled to the electrical path 206, such as by using one or more conductive vias that extend between the electrical paths 206 and 210 through the substrate 202. As a result, the switch assembly 116 can physically contact the major surface of the substrate 202 shown in FIG. 2C and use the electrical paths to the power supply 104 as described below in order to receive operational power and to identify the current rotational position of the switch knob 102.

Each of the electrical paths 204-210 can be formed from any suitable conductive material(s), such as metal. Each of the electrical paths 204-210 can also be formed in any suitable manner, such as by depositing and etching or printing the metal or other material forming the electrical paths 204-210. In addition, each of the electrical paths 204-210 can have any suitable size, shape, and dimensions. In this example, the electrical paths 204 and 208 are generally annular or ring-shaped and the electrical paths 206 and 210 are generally circular, although other forms can be used for the electrical paths 204-210.

Also shown in FIG. 2C are conductive pads 212 and an additional electrical path 214. The conductive pads 212 represent conductive contacts that can be physically touched by leaf spring contacts or other structures of the switch assembly 116. The conductive pads 212 are electrically coupled to the first terminal of the power supply 104 through the electrical paths 204 and 208, and the switch assembly 116 is able to detect when a leaf spring contact or other structure touches a conductive pad 212. This allows the switch assembly 116 to accurately determine the current rotational position of the switch knob 102. Each of the conductive pads 212 can be formed from any suitable conductive material(s), such as metal. Each of the conductive pads 212 can also be formed in any suitable manner, such as by depositing and etching or printing the metal or other material forming the conductive pads 212. In addition, each of the conductive pads 212 can have any suitable size, shape, and dimensions. In this example, the conductive pads 212 are generally shown as having an annular or ring segment shape, although other forms can be used for the conductive pads 212.

The additional electrical path 214 is electrically coupled to the electrical path 208. In this example, the additional electrical path 214 is electrically coupled to the electrical path 208 through one of the conductive pads 212, although this electrical connection can be formed in other ways. As described below, the additional electrical path 214 is used to provide power to one or more components (such as a controller of the switch assembly 116), regardless of the rotational position of the switch knob 102. Note, however, that the controller of the switch assembly 116 can be powered in other ways. The additional electrical path 214 can be formed from any suitable conductive material(s), such as metal. The electrical path 214 can also be formed in any suitable manner, such as by depositing and etching or printing the metal or other material forming the electrical path 214. In addition, the electrical path 214 can have any suitable size, shape, and dimensions. In this example, the electrical path 214 is generally annular or ring-shaped, although other forms can be used for the electrical path 214.

As shown in FIGS. 3A through 3C, the switch assembly 116 includes a substrate 302 on and through which various other components of the switch assembly 116 are mounted or formed. The substrate 302 is generally planar here and includes two opposing major surfaces. The major surface in FIG. 3A faces the interconnect assembly 114 when in use, and the major surface in FIG. 3C can be at least partially inserted through the retainer 118. The substrate 302 includes any suitable structure that carries or supports other components of the switch assembly 116, such as one or more dielectric materials. In some embodiments, the substrate 302 represents a printed circuit board.

Multiple leaf spring contacts 304a-304f (referred to collectively as leaf spring contacts 304) are mounted to the substrate 302. Each of the leaf spring contacts 304 is able to contact the conductive pads 212 of the interconnect assembly 114 and form detectable electrical connections based on rotation of the switch knob 102. Each leaf spring contact 304 here generally includes a broad electrical conductor 306 that is bent so that the portion of the electrical conductor 306 extending away from the substrate 302 (upward in FIG. 3B) can move and provide a spring force against the interconnect assembly 114. Each of the electrical conductors 306 has a conductive bump 308 on one end that actually contacts the interconnect assembly 114. The conductive bumps 308 provide small limited areas in which the electrical conductors 306 can form electrical connections with and through the interconnect assembly 114. Mounts 310 on the opposite side of the substrate 302 (the major surface in FIG. 3C) can be used to provide electrical connections to the conductors 306 of the leaf spring contacts 304 through the substrate 302.

Each of the leaf spring contacts 304 can be formed from any suitable conductive material(s), such as metal. Each of the leaf spring contacts 304 can also be formed in any suitable manner, such as by cutting and bending the metal or other material forming the electrical conductor 306 and depositing conductive material on the electrical conductor 306 to form the conductive bump 308. In addition, each of the leaf spring contacts 304 can have any suitable size, shape, and dimensions. Note that while the use of leaf spring contacts 304 is described here, any other suitable electrical contacts can be used in the switch assembly 116 to selectively form and break electrical connections to the interconnect assembly 114.

A controller 312 is electrically coupled to the leaf spring contacts 304. The controller 312 here uses the leaf spring contacts 304 to both (i) receive operating power from the power supply 104 and (ii) identify what digital value should be generated to identify the current rotational position of the switch knob 102. In the arrangement of the leaf spring contacts 304 shown here, the leaf spring contact 304a is positioned so that its conductive bump 308 touches the electrical path 214, and the leaf spring contact 304b is positioned so that its conductive bump 308 touches the electrical path 210. As a result, the leaf spring contacts 304a-304b provide electrical connections to both terminals of the power supply 104, which allows the controller 312 to receive operating power from the power supply 104 regardless of the rotational position of the switch knob 102. However, as noted above, the controller 312 can be powered in other ways, in which case the leaf spring contacts 304a-304b may be omitted.

Each of the leaf spring contacts 304c-304f is positioned so that its conductive bump 308 is potentially able to contact one of the conductive pads 212 on the interconnect assembly 114. Depending on the rotational position of the switch knob 102, each of the leaf spring contacts 304c-304f may or may not be in a position to contact one of the conductive pads 212 on the interconnect assembly 114. If a leaf spring contact 304c-304f does contact one of the conductive pads 212, the controller 312 can detect the presence of an electrical path through that leaf spring contact 304c-304f. If a leaf spring contact 304c-304f does not contact one of the conductive pads 212, the controller 312 can detect the absence of an electrical path through that leaf spring contact 304c-304f. Based on the presence or absence of electrical paths through the leaf spring contacts 304c-304f, the controller 312 can generate a digital value identifying the current rotational position of the switch knob 102. The leaf spring contacts 304c-304f can therefore be viewed as representing switches that are either opened (not contacting one of the conductive pads 212) or closed (contacting one of the conductive pads 212). In this example, the leaf spring contacts 304c-304f are positioned so that their conductive bumps 308 are distributed evenly around the perimeter of the switch assembly 116, although this need not be the case.

As described briefly above and in more detail below, the arrangement of the conductive pads 212 can be designed to provide a non-sequential unique bit pattern for the rotary encoder 100. For example, techniques described below can be used to identify locations where a first digital bit (such as a logical "1" bit) should be used and/or locations where a second digital bit (such as a logical "0" bit) should be used. Locations for the first digital bit can be selected for inclusion of conductive pads 212 at those locations, and locations for the second digital bit can be selected for exclusion of conductive pads 212 at those locations (or vice versa). By following the techniques described below, the locations of the conductive pads 212 enable the controller 312 to generate non-sequential digital values as the switch knob 102 is rotated, and the digital values uniquely define different discrete rotational positions of the switch knob 102.

The controller 312 includes any suitable structure for generating digital values based on detected electrical paths. For example, the controller 312 can include one or more microprocessors, microcontrollers, digital signal processors (DSPs), field programmable gate arrays (FPGAs), application specific integrated circuits (ASICs), or discrete circuitry. The controller 312 can output the generated digital value(s) to any suitable destination or destinations. Also or alternatively, the controller 312 can use the generated digital value(s) to perform or initiate one or more functions.

Note that while the use of switches configured to selectively form electrical connections have been described above, other types of switches could also be used in the rotary encoder 100. For example, the conductive pads 212 could be replaced by light sources or optical fibers coupled to light sources, and the leaf switches 304 could be replaced by photodetectors. A connection could then be said to exist when a light source is adequately aligned with a photodetector such that the photodetector's output exceeds a specified threshold. As another example, the conductive pads 212 could be replaced by magnets, and the leaf switches 304 could be replaced by Hall effect sensors. A connection could then be said to exist when a magnet is adequately aligned with a Hall effect sensor such that the Hall effect sensor's output exceeds a specified threshold.

Although FIGS. 2A through 3C illustrate examples of components in the rotary encoder 100 of FIGS. 1A through 1C, various changes may be made to FIGS. 2A through 3C. For example, the relative sizes, shapes, and dimensions of the components in FIGS. 2A through 3C are for illustration only. Also, the electrical paths and connections shown here are examples only and can vary as needed or desired. Further, the designs of the interconnect assembly 114 and the switch assembly 116 shown here are based on the use of four leaf spring contacts 304c-304f to detect the rotational position of the switch knob 102. Other designs can use other numbers of switches to detect the rotational position of the switch knob 102. In addition, as described below, the locations where the switches form connections can vary from those shown here, even when four switches are used to detect the rotational position of the switch knob 102.

Figure 4:
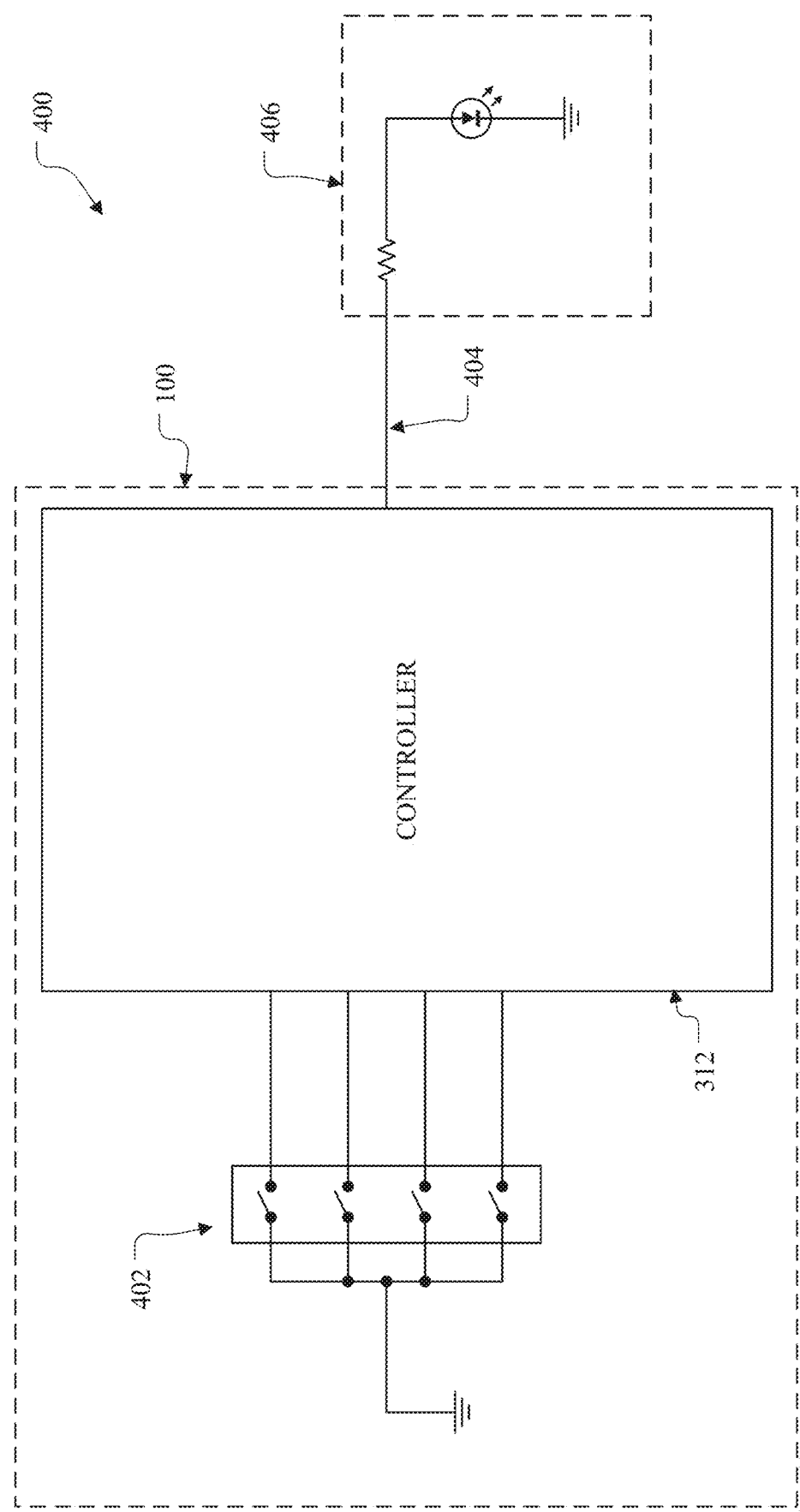
FIG. 4 illustrates an example system with a rotary encoder having a non-sequential unique bit pattern according to this disclosure.

FIG. 4 illustrates an example system 400 with a rotary encoder having a non-sequential unique bit pattern according to this disclosure. For ease of explanation, the system 400 of FIG. 4 is described as including one instance of the rotary encoder 100. However, the rotary encoder 100 can be used in any other suitable device or system.

As shown in FIG. 4, the rotary encoder 100 is shown in simplified form as including a switch bank 402 and the controller 312. The switch bank 402 represents the leaf spring contacts 304c-304f or other switches of the rotary encoder 100, which as noted above are either opened or closed depending on whether the leaf spring contacts 304c-304f contact the conductive pads 212 (or whether other portions of the switches are adequately aligned). Each of the switches in the switch bank 402 could therefore denote a switch that selectively forms an electrical connection, a magnetic connection, an optical connection, or any other connection that can be selectively formed based on the rotational position of the switch knob 102 or other object. The switch bank 402 includes four switches here since there are four leaf spring contacts 304c-304f in the switch assembly 116 described above, although other numbers of leaf spring contacts (and therefore switches) can be used in the switch assembly 116 and shown in FIG. 4. The controller 312 generates one or more outputs 404 based on the states of the switches, meaning which of the leaf spring contacts 304c-304f if any are contacting the conductive pads 212 (or which of the switches if any have portions that are adequately aligned).

The output or outputs 404 of the controller 312 can be used in any suitable manner. In this example, the rotary encoder 100 is coupled to electrical circuitry 406 that operates using the output 404 from the rotary encoder 100. In this particular embodiment, the electrical circuitry 406 includes a resistor coupled in series with one or more light emitting diodes (LEDs). The output 404 from the controller 312 can therefore represent a current or a voltage that creates a current flowing through the one or more LEDs. The amount of current flowing through the one or more LEDs can affect the amount of illumination produced by the LED(s), so the different settings of the switch knob 102 of the rotary encoder 100 can correspond to different output voltages or currents and therefore different amounts of illumination.

This type of illumination control can be used in various devices or systems, such as weapon sights (like digital, optical, or thermal sights), spatial sensors, or other electro-optical systems. For example, this illumination control can be used to control the intensity of reticle patterns or other content displayed in the electro-optical systems. However, the rotary encoder 100 can be used with any other suitable electrical circuitry 406 or other components. For instance, the rotary encoder 100 can be used to output one or more signals that control one or more operations of robotics, mechanical devices, or other machinery based on the rotational position of the switch knob 102. As a particular example, the rotational positions of the switch knob 102 can be translated into different locations for a mechanical device, and rotation of the switch knob 102 can cause movement of the mechanical device between those locations. The rotary encoder 100 can also be used to provide one or more signals that are based on user inputs to fire control systems, missile guidance systems, or remote control devices. The rotary encoder 100 can further be used as one or more dials that provide one or more signals that are based on user inputs to electronic devices, such as volume controls, tuning controls, or other controls for commercial or military radios or other electronic devices.

Although FIG. 4 illustrates one example of a system 400 with a rotary encoder having a non-sequential unique bit pattern, various changes may be made to FIG. 4. For example, multiple rotary encoders can be used to provide inputs to the controller 312. Also, the rotary encoder 100 can be used with any suitable electrical circuitry or other components.

Figure 5:
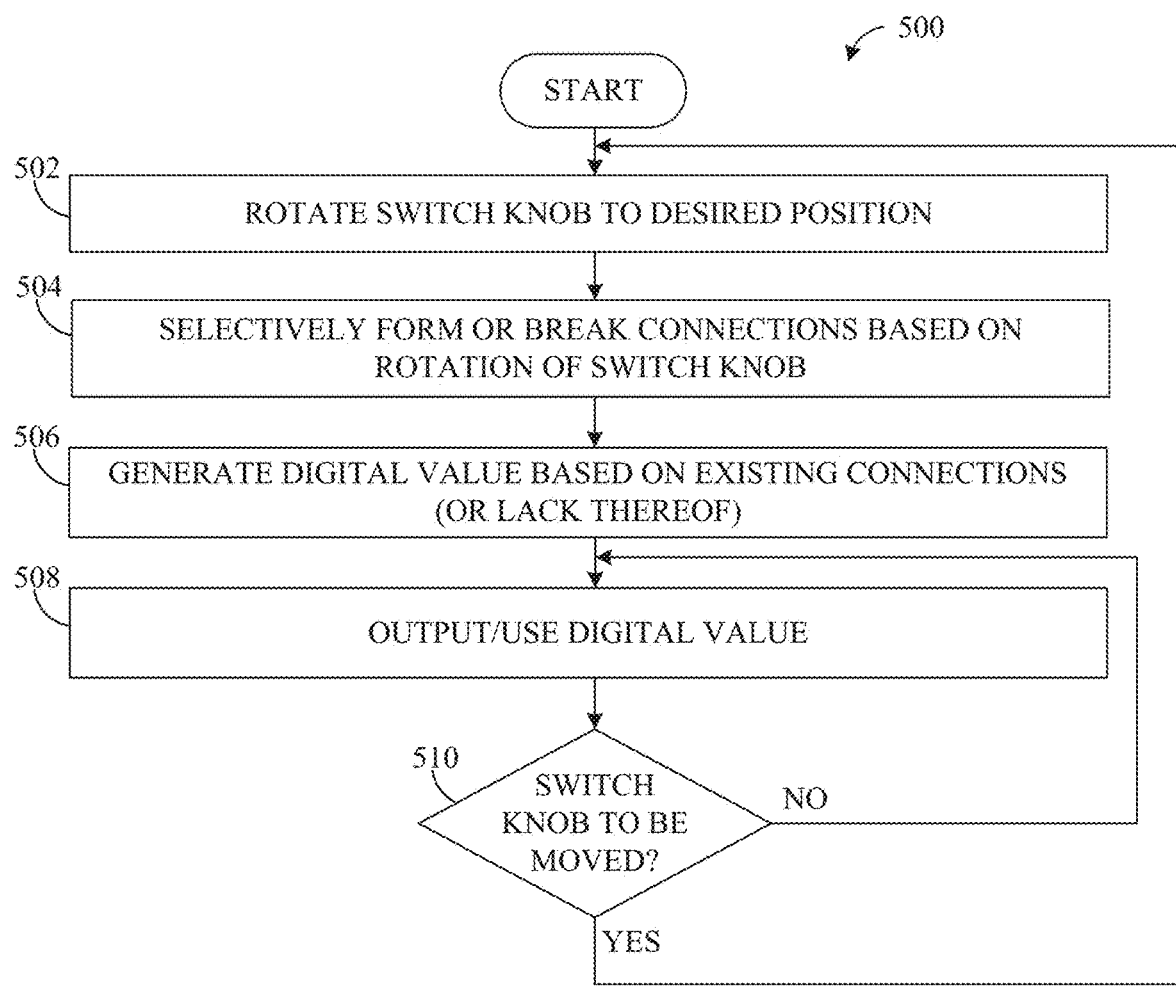
FIG. 5 illustrates an example method for rotary encoding based on a non-sequential unique bit pattern according to this disclosure.

FIG. 5 illustrates an example method 500 for rotary encoding based on a non-sequential unique bit pattern according to this disclosure. For ease of explanation, the method 500 of FIG. 5 is described as involving the use of the rotary encoder 100. However, the method 500 can be used with other implementations of a rotary encoder.

As shown in FIG. 5, a switch knob (or other object) is rotated to a desired position at step 502. This can include, for example, a user rotating the switch knob 102 so that the switch knob 102 obtains a desired rotational position. Connections are selectively formed and/or broken based on the rotation of the switch knob at step 504. This can include, for example, the leaf spring contacts 304c-304f of the switch assembly 116 touching or not touching the conductive pads 212 of the interconnect assembly 114. If other types of switches are used (such as optical or magnetic switches), this could include portions of the switches adequately aligning or not adequately aligning. The connections that are or are not formed uniquely define the current rotational position of the switch knob 102.

A digital value is generated based on the connections that are or are not formed at step 506. This can include, for example, the controller 312 identifying the leaf spring contacts 304c-304f that have formed electrical connections and assigning a digital "1" bit to those leaf spring contacts. This can also include the controller 312 identifying the leaf spring contacts 304c-304f that have not formed electrical connections and assigning a digital "0" bit to those leaf spring contacts. Of course, the "1" and "0" digital bits can be reversed here, and the use of leaf spring contacts is not required here as noted above. The resulting combination and "1" and/or "0" bits can define the digital value generated by the controller 312. The digital value is output or used in some manner at step 508. This can include, for example, the controller 312 generating an output voltage or current that is based on the current digital value or outputting the digital value to another component for use. As noted above, the digital value can be used to perform various functions, such as intensity control, volume control, tuning control, mechanical device movement, or user input. If the switch knob is to be moved again at step 512, the process can return to step 502 to generate a new digital value based on the altered rotational position of the switch knob. Otherwise, the controller 312 can continue to output or use the current digital value.

Although FIG. 5 illustrates one example of a method 500 for rotary encoding based on a non-sequential unique bit pattern, various changes may be made to FIG. 5. For example, while shown as a series of steps, various steps in FIG. 5 can overlap, occur in parallel, or occur any number of times. As a particular example, the selective formation or breaking of the connections can occur while the switch knob 102 is being rotated.

Figure 6:
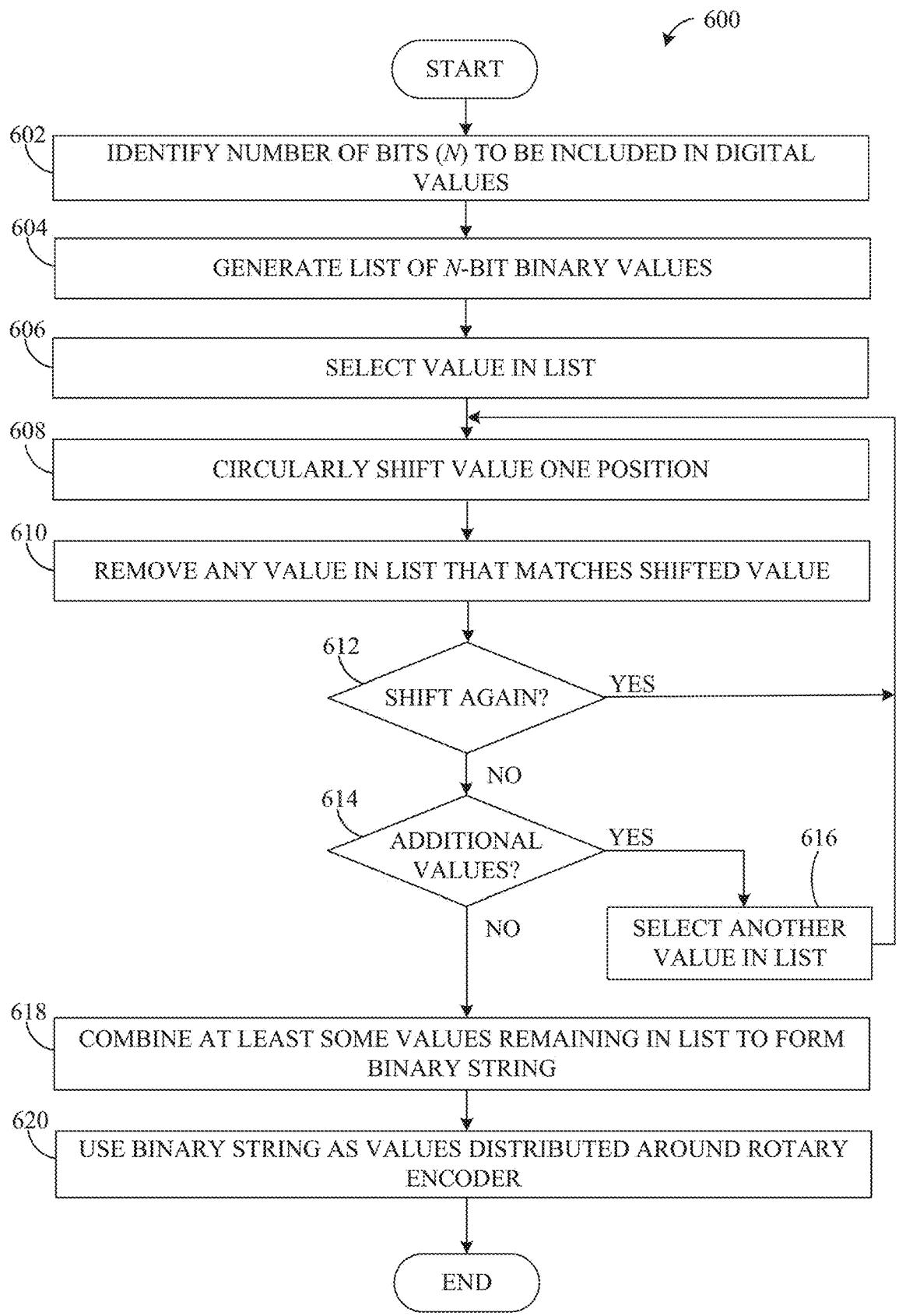
FIG. 6 illustrates an example method for generating a non-sequential unique bit pattern for a rotary encoder according to this disclosure.

FIG. 6 illustrates an example method 600 for generating a non-sequential unique bit pattern for a rotary encoder according to this disclosure. For ease of explanation, the method 600 of FIG. 6 is described as involving the design of the rotary encoder 100. However, the method 600 can be used with other implementations of a rotary encoder.

As shown in FIG. 6, a desired number of bits (denoted N) to be included in digital values generated by a rotary encoder and representing the rotational position of an object is identified at step 602. This can include, for example, a user identifying the number of bits to be generated by the rotary encoder 100. The number of bits can vary based on a number of factors, such as the intended application and the desired resolution (number of discrete rotational positions) of the rotary encoder 100. In some embodiments, the number of bits N can be selected so that the desired number of discrete rotational positions is an integer multiple of the number of bits N.

A list of N-bit binary values is generated at step 604. This can include, for example, generating a list that includes binary values from zero to $2^N$ or a subset of those values, such as values from one to $2^{(N-1)}-1$ or from $2^{(N-1)}$ to $2^N-2$. When N equals four, the list can include at least the binary values from one to seven (0001 to 0111) or at least the binary values from eight to fourteen (1000 to 1110).

A value in the list is selected at step 606, and the value is circularly shifted at step 608. This can include, for example, selecting the first binary value in the list and circularly shifting the value to the left or right one position. Any binary value in the list that matches the shifted value is removed at step 610. A determination is made whether to shift the value again at step 612. This can include, for example, determining if the selected value from the list has been circularly shifted N−1 times. If not, the process returns to step 608 to circularly shift the value again. In some embodiments, a counter can be incremented or decremented for each circular shift to count the number of circular shifts. Note that while the direction of the circular shift is immaterial here, the circular shifting occurs in the same direction for each pass through step 608.

After the selected value has been circularly shifted the desired number of times, a determination is made whether there are additional values in the list that remain to be processed at step 614. This can include, for example, determining whether any values remaining in the list have not undergone the circular shift process. If so, another value in the list is selected at step 616, and the process returns to step 608 to circularly shift the newly-selected value.

The process that occurs in steps 602-616 can be summarized as follows. A list of binary values is generated, and binary values are removed from the list until each binary value remaining in the list cannot be circularly shifted one to N−1 times and equal another binary value remaining in the list. The binary values remaining in the list can be said to be "circularly-shift exclusive" of one another since no binary value remaining in the list has a circularly-shifted version that matches another binary value remaining in the list. This is why the list that is generated in step 604 can include values only from one to $2^{(N-1)}-1$ or only from $2^{(N-1)}$ to $2^N-2$. The binary value "0" contains all zeros and the binary value $2^N-1$ contains all ones, so any circular shift of either value would result in that value being removed from the list. Also, all of the values from $2^{(N-1)}$ to $2^N-2$ would be deleted as being circularly-shifted versions of one or more values from one to $2^{(N-1)}-1$ (or vice versa), so one of these sets can be included in the list without the other set. As a result, the original list generated in step 604 can contain all N-bit values or any subset of N-bit values, as long as the processing of those values leaves two or more N-bit values in the list.

If there are no additional values to be processed in the list, at least some of the remaining values in the list are combined to form a binary string at step 618. This can include, for example, concatenating the bits from two or more of the remaining values in the list to create a longer binary string. This can also include interleaving the bits of two or more of the remaining values into a longer binary string, where the bits are interleaved so that the bits of each remaining value included in the longer binary string are evenly-spaced within the longer binary string. Note that some or all of the remaining values in the list can be used here, and the number of remaining values used can depend in some instances on the desired resolution (number of discrete rotational positions) of the rotary encoder 100. For instance, when N equals five, seven values may remain in the list after steps 602-616. Using three remaining values from the list would allow the rotary encoder 100 to have fifteen discrete rotational positions. Using all seven remaining values from the list would allow the rotary encoder 100 to have thirty-five discrete rotational positions. Thus, the number of remaining values from the list used here can vary based on the desired number of discrete rotational positions.

The binary string is used by distributing the values in the binary string around a rotary encoder at step 620. This can include, for example, dividing the rotary encoder into equal sections based on the number of bits in the binary string and assigning each section a "1" or "0" value based on the bits in the binary string. As noted above, in some embodiments, sections with a "1" value denote areas where switches can form connections, while sections with a "0" value denote areas where switches cannot form connections. However, the opposite arrangement can also be used. At this point, rotary encoders can be manufactured having this arrangement.

As an example of this process, assume a rotary encoder 100 will generate digital values containing four bits (N=4). The list generated in step 604 can include values of 0001, 0010, 0011, 0100, 0101, 0110, and 0111. The first value 0001 can be selected and circularly shifted three times to generate 0010, 0100, and 1000, and the values 0010 and 0100 are removed from the list since they are circularly-shifted versions of the selected value. At this point, the list contains the values 0001, 0011, 0101, 0110, and 0111. The next value 0011 is selected and circularly shifted three times to generate 0110, 1100, and 1001, and the value 0110 is removed from the list since it is a circularly-shifted version of the selected value. At this point, the list contains the values 0001, 0011, 0101, and 0111. The next value 0101 is selected and circularly shifted three times to generate 1010, 0101, and 1010, and the value 0101 is removed from the list since it is a circularly-shifted version of itself. At this point, the list contains the values 0001, 0011, and 0111. Finally, the value 0111 is selected and circularly shifted three times to generate 1110, 1101, and 1011, and no matching values exist in the list. As a result, there are three values (0001, 0011, and 0111) that can be used to generate the "0" and "1" pattern for a rotary encoder.

These three values are then combined, such as by concatenation or interleaving of their bits, to produce a binary string. For example, concatenating the three values can produce the binary string "000100110111." However, the actual order of the remaining values during the concatenation is immaterial, so other concatenations of the remaining values can be used. Also, as noted above, not all of the remaining values need to be used during the concatenation. Alternatively, interleaving the bits of the three values (starting with the most significant bits and taking the values in order from lowest to highest as an example) yields the binary string "000001011111" (where the values not underlined form 0001, the values single underlined form 0011, and the values double underlined form 0111). Again, however, the actual order of the remaining values during the interleaving is immaterial, so other interleaving of the remaining values can be used. Also, not all of the remaining values need to be used during the interleaving. Because the order of the remaining values in the list after steps 602-616 is immaterial, the order in which the values are selected and circularly shifted is also immaterial.

Figure 7:
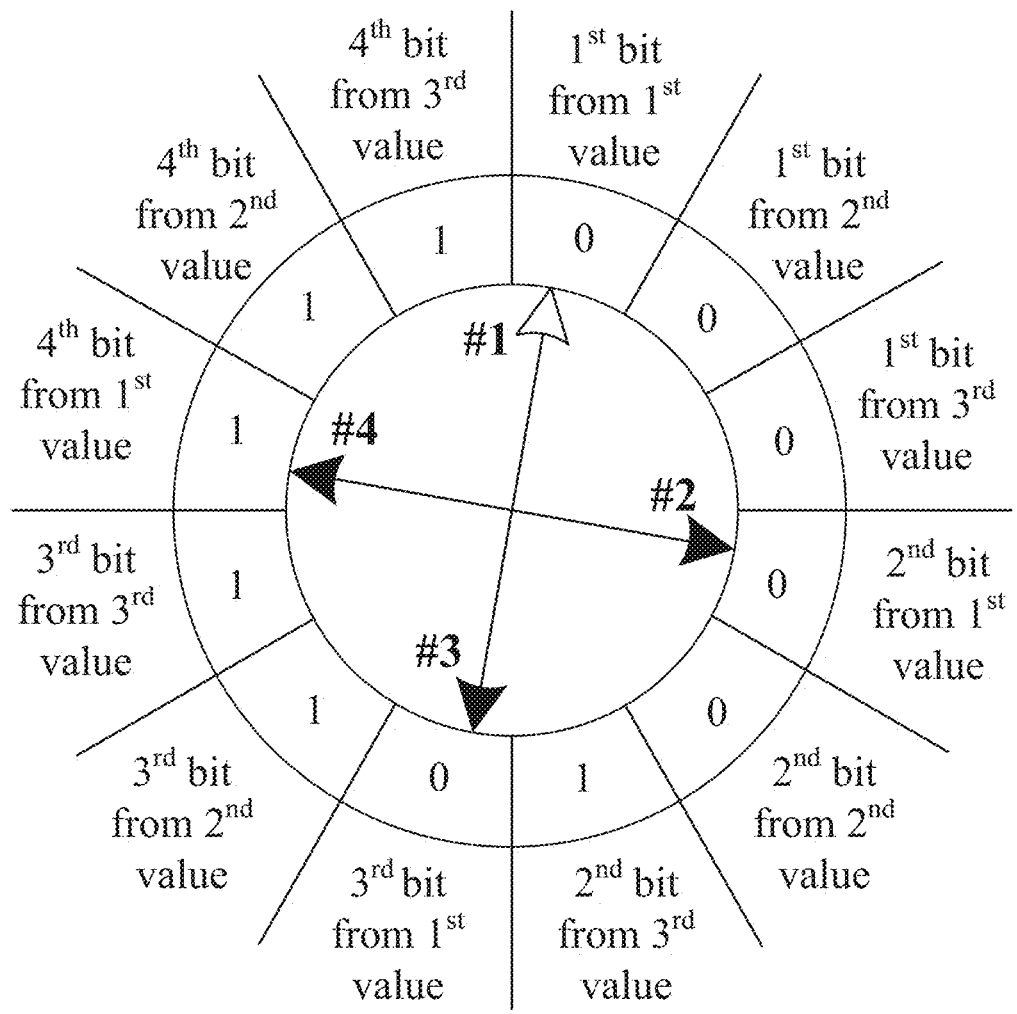
FIG. 7 illustrates an example encoding using a rotary encoder having a non-sequential unique bit pattern according to this disclosure.

In whatever manner at least some of the remaining binary values are combined, the bits in the resulting binary string can be distributed around a rotary encoder. An example of this is shown in FIG. 7, which illustrates an example encoding using a rotary encoder having a non-sequential unique bit pattern according to this disclosure. The example in FIG. 7 uses the binary string "000001011111" produced by interleaving as described above, although a similar arrangement can be used with the binary string "000100110111" produced above. Either binary string works, but the sequence of unique values generated is different.

When a rotary encoder 100 is designed using this process, the rotary encoder 100 provides a unique digital value for each discrete rotational position of the switch knob 102, and those digital values are non-sequential as the switch knob 102 is rotated. In FIG. 7, for example, assume that the switch knob 102 is represented by the four arrows, where the digital value is generated using the values identified by the four arrows. Also assume that arrow #1 is the most significant bit of the digital value and the remaining bits are read in order of decreasing significance moving clockwise (this is not actually required but is useful for illustration). In the position shown in FIG. 7, the digital value is 0001 since arrow #1 is associated with a "0" bit, arrow #2 is associated with a "0" bit, arrow #3 is associated with a "0" bit, and arrow #4 is associated with a "1" bit. In this position, only the leaf spring contact 304f may be contacting a conductive pad 212 (assuming the design shown in FIGS. 2A through 2C).

Figure 8:
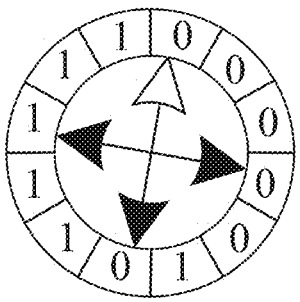
FIG. 8 illustrates example digital values associated with the rotary encoder of FIG. 7 according to this disclosure.
Figure 8:
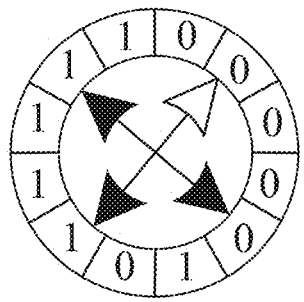
Figure 8:
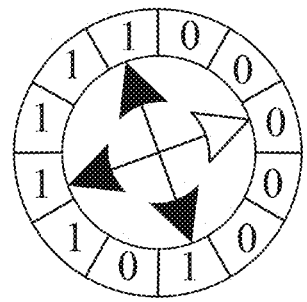
Figure 8:
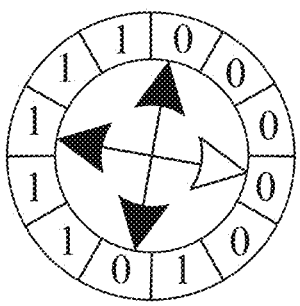
Figure 8:
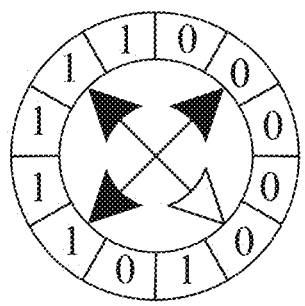
Figure 8:
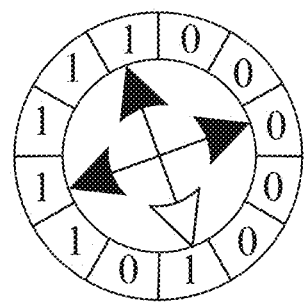
Figure 8:
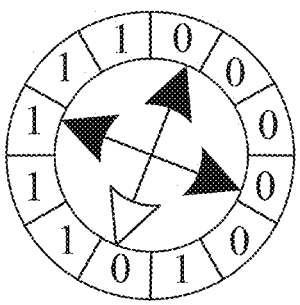
Figure 8:
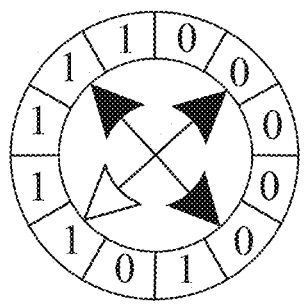
Figure 8:
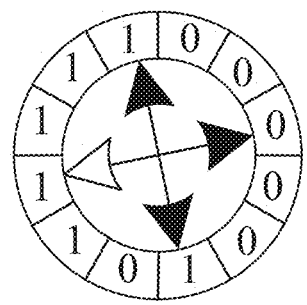
Figure 8:
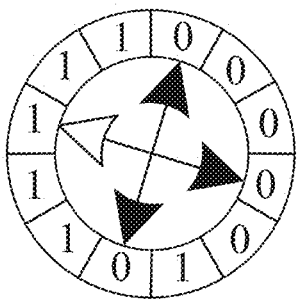
Figure 8:
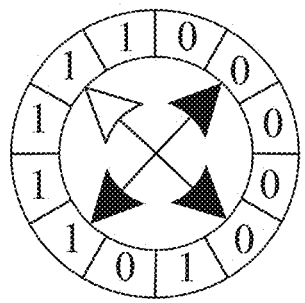
Figure 8:
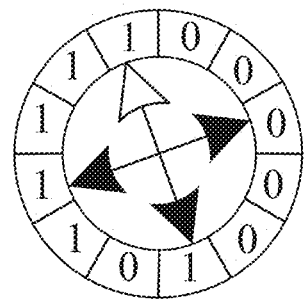

All twelve possible discrete rotational positions of the switch knob 102 are shown in FIG. 8, which illustrates example digital values associated with the rotary encoder of FIG. 7 according to this disclosure. Each of the discrete rotational positions is associated with a unique digital value, and the digital values are non-sequential as the switch knob 102 is rotated. Thus, a rotary encoder can be designed so that its switches form connections at the appropriate positions (such as the "1" positions here) in order to implement the non-sequential unique bit pattern.

Although FIG. 6 illustrates one example of a method 600 for generating a non-sequential unique bit pattern for a rotary encoder, various changes may be made to FIG. 6. For example, while shown as a series of steps, various steps in FIG. 6 can overlap, occur in parallel, or occur any number of times. Although FIG. 7 illustrates one example of an encoding using a rotary encoder having a non-sequential unique bit pattern and FIG. 8 illustrates one example of digital values associated with the rotary encoder of FIG. 7, various changes may be made to FIGS. 7 and 8. For instance, as noted above, the binary string around the rotary encoder can be different (even for N=4) based on the order of the remaining values generated by steps 602-616, the number of remaining values used to generate the binary string, and the method of combining the remaining values.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to)

"mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus for rotary encoding, the apparatus comprising:
   a knob configured to be rotated;
   multiple switches each configured to selectively form or not form a connection based on a current rotational position of the knob; and
   a controller configured to generate or use a digital value associated with the current rotational position of the knob, the digital value defined by which switches have or have not formed connections;
   wherein locations where the switches form the connections are selected such that the digital values uniquely identify different rotational positions of the knob and are non-sequential as the knob is rotated; and
   wherein multiple bits of each digital value are defined based on the switches that are arranged in a single annular ring positioned at a specified radial distance from a center of the knob.

2. The apparatus of claim 1, wherein each switch comprises an electrical contact that is configured to form or not form an electrical connection to one of multiple conductive pads based on the current rotational position of the knob.

3. The apparatus of claim 1, wherein the switches are configured to form at least one of electrical connections, magnetic connections, and optical connections.

4. The apparatus of claim 1, further comprising:
   a power supply configured to provide electrical power to the controller; and
   an interconnect assembly comprising conductive paths configured to electrically couple a switch assembly comprising the controller to the power supply.

5. An apparatus for rotary encoding, the apparatus comprising:
   a knob configured to be rotated;
   multiple switches each configured to selectively form or not form a connection based on a current rotational position of the knob; and
   a controller configured to generate or use a digital value associated with the current rotational position of the knob, the digital value defined by which switches have or have not formed connections;
   wherein locations where the switches form the connections are selected such that the digital values uniquely identify different rotational positions of the knob and are non-sequential as the knob is rotated; and
   wherein the locations where the switches form the connections are selected using a binary string that is generated by:
   creating a list containing multiple binary values;
   removing any binary value from the list that is a circularly-shifted version of another binary value remaining in the list; and
   creating the binary string using at least some of the remaining binary values in the list.

6. The apparatus of claim 5, wherein the binary string is created by concatenating or interleaving bits from at least some of the remaining binary values in the list.

7. The apparatus of claim 5, wherein:
   each binary value contains a specified number of bits; and
   a number of discrete rotational positions of the knob for which digital values are to be generated is an integer multiple of the specified number of bits.

8. A system comprising:
   a rotary encoder comprising:
      a knob configured to be rotated;
      multiple switches each configured to selectively form or not form a connection based on a current rotational position of the knob; and
      a controller configured to generate or use a digital value associated with the current rotational position of the knob, the digital value defined by which switches have or have not formed connections;
      wherein locations where the switches form the connections are selected such that the digital values uniquely identify different rotational positions of the knob and are non-sequential as the knob is rotated; and
      wherein multiple bits of each digital value are defined based on the switches that are arranged in a single annular ring positioned at a specified radial distance from a center of the knob; and
   circuitry configured to receive an output from the controller, the output comprising the digital value or a signal based on the digital value.

9. The system of claim 8, wherein the controller is configured to provide one or more of: intensity control, volume control, tuning control, mechanical device movement, or user input to the circuitry.

10. The system of claim 8, wherein each switch comprises an electrical contact that is configured to form or not form an electrical connection to one of multiple conductive pads based on the current rotational position of the knob.

11. The system of claim 8, wherein the switches are configured to form at least one of electrical connections, magnetic connections, and optical connections.

12. The system of claim 11, wherein:
    the system further comprises a power supply configured to provide electrical power to the controller; and
    the rotary encoder includes an interconnect assembly comprising conductive paths configured to electrically couple a switch assembly comprising the controller to the power supply.

13. The system of claim 8, wherein the circuitry comprises a resistor and one or more light emitting diodes.

14. A system comprising:
    a rotary encoder comprising:
       a knob configured to be rotated;
       multiple switches each configured to selectively form or not form a connection based on a current rotational position of the knob; and
       a controller configured to generate or use a digital value associated with the current rotational position of the knob, the digital value defined by which switches have or have not formed connections;
       wherein locations where the switches form the connections are selected such that the digital values uniquely identify different rotational positions of the knob and are non-sequential as the knob is rotated; and circuitry configured to receive an output from the controller, the output comprising the digital value or a signal based on the digital value;

wherein the locations where the switches form the connections are selected using a binary string that is generated by:
  creating a list containing multiple binary values;
  removing any binary value from the list that is a circularly-shifted version of another binary value remaining in the list; and
  creating the binary string using at least some of the remaining binary values in the list.

15. The system of claim 14, wherein:

each binary value contains a specified number of bits; and a number of discrete rotational positions of the knob for which digital values are to be generated is an integer multiple of the specified number of bits.

16. A method comprising:

identifying a specified number of bits to be used to represent a rotational position of a knob of a rotary encoder;

identifying multiple binary values each containing the specified number of bits, where the binary values are circularly-shift exclusive of one another such that each binary value is not a circularly shifted version of the other binary values;

creating a binary string using at least some of the binary values; and using bits in the binary string to identify different positions at which switches of the rotary encoder will or will not form connections in order to identify a current rotational position of the knob, wherein the different positions are located radially around a center of the knob.

17. The method of claim 16, wherein the positions are selected such that digital values generated by the rotary encoder uniquely identify different rotational positions of the knob and are non-sequential as the knob is rotated.

18. The method of claim 17, wherein a number of discrete rotational positions of the knob for which the digital values are to be generated is an integer multiple of the specified number of bits.

19. The method of claim 16, wherein creating the binary string comprises concatenating or interleaving bits from at least some of the binary values.

20. The method of claim 16, further comprising:

manufacturing the rotary encoder having electrical, magnetic, or optical switches configured to selectively form or not form the connections in the identified positions.

* * * * *